United States Patent [19]

Schultz et al.

[11] Patent Number: 4,803,447
[45] Date of Patent: Feb. 7, 1989

[54] THREE TERMINAL REMOTELY CONTROLLED SPDT ANTENNA SWITCH

[75] Inventors: Charles A. Schultz, Sunrise; Paul D. Marko, Pembroke Pines; Giovanni Jaramillo, Plantation, all of Fla.

[73] Assignee: Motorola, Inc., Schaumburg, Ill.

[21] Appl. No.: 161,502

[22] Filed: Feb. 29, 1988

[51] Int. Cl.$^4$ .................. H03H 11/36; H01P 1/15
[52] U.S. Cl. .................. 333/103; 333/262; 455/78; 455/129; 455/277
[58] Field of Search .............. 333/101, 103, 104, 262; 455/78, 129, 272, 277, 279

[56] References Cited

U.S. PATENT DOCUMENTS

| | | | |
|---|---|---|---|
| 3,076,155 | 1/1963 | Parker | 333/101 |
| 4,085,366 | 4/1978 | Padgett | 455/78 |
| 4,525,869 | 6/1985 | Hamada et al. | 455/277 |
| 4,584,709 | 4/1986 | Kneisel et al. | 455/277 X |
| 4,626,806 | 12/1986 | Rosar et al. | 333/103 X |
| 4,656,364 | 4/1987 | Yokogawa et al. | 333/103 X |

FOREIGN PATENT DOCUMENTS

| | | | |
|---|---|---|---|
| 39701 | 2/1986 | Japan | 333/103 |
| 87/00696 | 1/1987 | PCT Int'l Appl. | 333/104 |
| 1231549 | 5/1986 | U.S.S.R. | 333/104 |

Primary Examiner—Eugene R. Laroche
Assistant Examiner—Benny T. Lee
Attorney, Agent, or Firm—Martin J. McKinley

[57] ABSTRACT

An antenna switch (302) includes a radio terminal (R) and first and second antenna terminals (A1 and A2). When the second antenna terminal (A2) is unterminated, the radio terminal (R) is coupled to the first antenna terminal (A1). When the second antenna terminal (A2) is connected to a remote antenna system (304), the switch automatically couples the radio terminal (R) to the second antenna terminal (A2). Thus, the switch does not require a separate control terminal (C) and control signal to switch between the first and second antenna terminals. Instead, the switch is controlled by the presence or absence of a DC current at the second antenna terminal (A2). The remote antenna system includes a remote antenna (308) and a low pass filter (310) coupled between the remote antenna and ground. An alternate embodiment is described which includes a DC amplifier (402).

6 Claims, 3 Drawing Sheets

THREE TERMINAL REMOTELY CONTROLLED SPDT ANTENNA SWITCH

BACKGROUND OF THE INVENTION

This invention pertains to antenna switches and, more particularly, to an antenna switch that automatically switches from a first to a second antenna when the second antenna is connected to the switch.

FIG. 1 is a schematic diagram of a prior art, four terminal, remotely controlled, single-pole double-throw (SPDT) antenna switch 100. Radio terminal R is connected to the RF input/output terminal of a non-illustrated radio transceiver. Antenna terminal A1 is connected to a first or local antenna 101 while antenna terminal A2 is connected to a second or remote antenna 118. The DC voltage at a separate control terminal C determines whether radio terminal R is coupled to antenna terminal A1 or A2.

When the control voltage source 102 and, consequently, the voltage at control terminal C are a ground potential, a DC current flows from a source of positive voltage V+ through resistor 104, RF choke 106, diodes 108 and 110, and RF choke 112. This current causes diodes 108 and 110 to switch to the conducting state. When diode 110 is conducting, capacitor 114 and inductor 116 form a parallel tuned circuit which is anti-resonant at the operating frequency. This anti-resonant parallel tuned circuit decouples radio terminal R from antenna terminal A1 by inserting a high impedance in the path between these two terminals. Since diode 108 is in the conducting state when control terminal C is grounded, radio terminal R is coupled to antenna terminal A2 through diode 108 and capacitors 120 and 122.

When the voltage at control voltage source 102 and control terminal C are at V+, no DC current flows through diodes 108 and 110, and the diodes switch to the open-circuit state. Since diode 108 is in the open-circuit state, radio terminal R is decoupled from antenna terminal A2. When diode 110 is in the open-circuit state, capacitor 114 and inductor 116 no longer form an anti-resonant parallel tuned circuit. Consequently, radio terminal R is coupled to antenna terminal A1 through inductor 116 and capacitors 120 and 124.

FIG. 2 is a schematic diagram of a prior art, four terminal, transmit/receive ("T/R") switch. Transmit terminal TX is connected to the output of a non-illustrated transmitter, and receive terminal RX is coupled to the input of a non-illustrated receiver. When the voltage at input control terminal C is sufficiently above ground potential, current flows through RF choke 202, diode 204, quarter wavelength transmission line 206 and diode 208, thereby switching diodes 204 and 208 to the conducting state. When diode 208 is conducting, terminal 206A of transmission line 206 is shorted to ground. This causes the impedance at the other terminal 206B to go to infinity, thereby decoupling antenna terminal A from receive terminal RX. Since diode 204 is conducting, transmit terminal TX is coupled to terminal A and antenna 210 through capacitor 212 and diode 204.

When the voltage at control terminal C is near ground potential, no current flows through diodes 204 and 208. Consequently, diodes 204 and 208 are switched to the open-circuit state. Thus, antenna terminal A is coupled through transmission line 206 and capacitor 214 to receive terminal RX. Since diode 204 is in the open-circuit state, transmit terminal TX is decoupled from antenna terminal A.

The switches illustrated in Figs. 1 and 2 are both SPDT RF type switches. In addition to the three terminals of a conventional mechanical SPDT switch, both prior art switches require an additional control terminal C. Although the invention described below also provides SPDT RF switching, it has a distinct advantage in that the separate control terminal C has been eliminated. Thus, the invention only requires three terminals. The invention has an additional advantage in that switching from a first antenna to a second occurs automatically, simply by connecting the second antenna to the switch.

SUMMARY OF THE INVENTION

Briefly, the invention is a three terminal antenna switch for use with a remote antenna system that includes a remote antenna and a low pass filter coupled to the remote antenna. The switch includes a radio terminal, and first and second antenna terminals. Means are included for coupling the radio terminal to the first antenna terminal when the second antenna terminal is unterminated. Means are also included for coupling the radio terminal to the second antenna terminal when the second antenna terminal is coupled to the remote antenna. When the remote antenna system is coupled to the second antenna terminal, DC current flows through the second antenna terminal.

In another embodiment, the invention is a remote antenna switching system that includes a three terminal antenna switch and a remote antenna system. The three terminal antenna switch includes the elements described in the above paragraph. The remote antenna system includes a remote antenna coupled to a low pass filter.

DESCRIPTION OF THE PREFERRED EMBODIMENT

Figure 1:
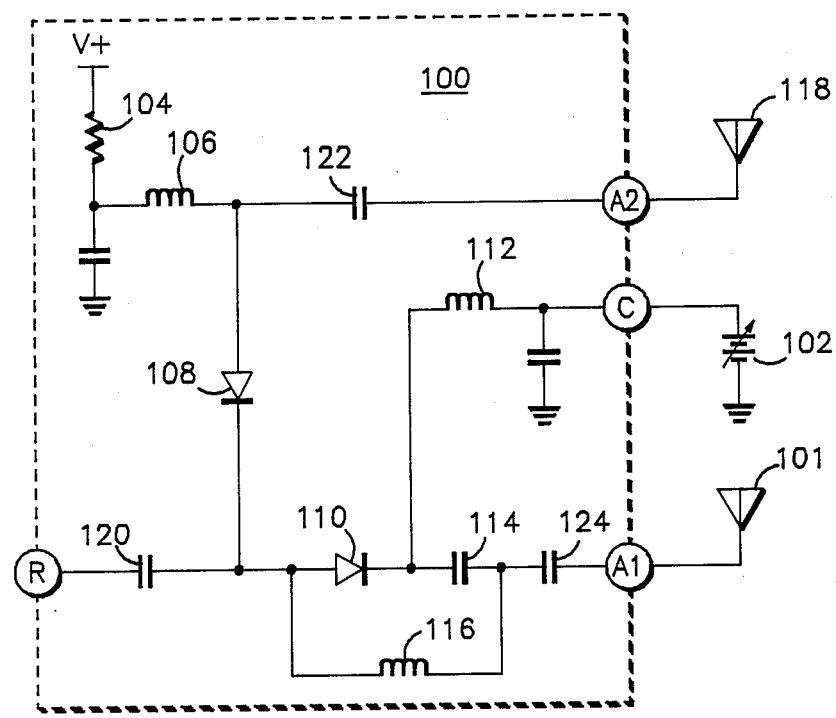
FIG. 1 is a schematic diagram of a prior art, four terminal, SPDT antenna switch.
Figure 2:
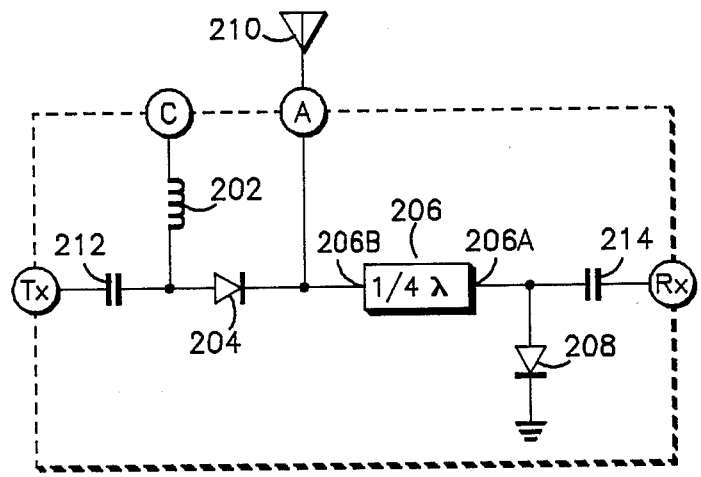
FIG. 2 is a schematic diagram of a prior art, four terminal, transmit/receive switch.
Figure 3:
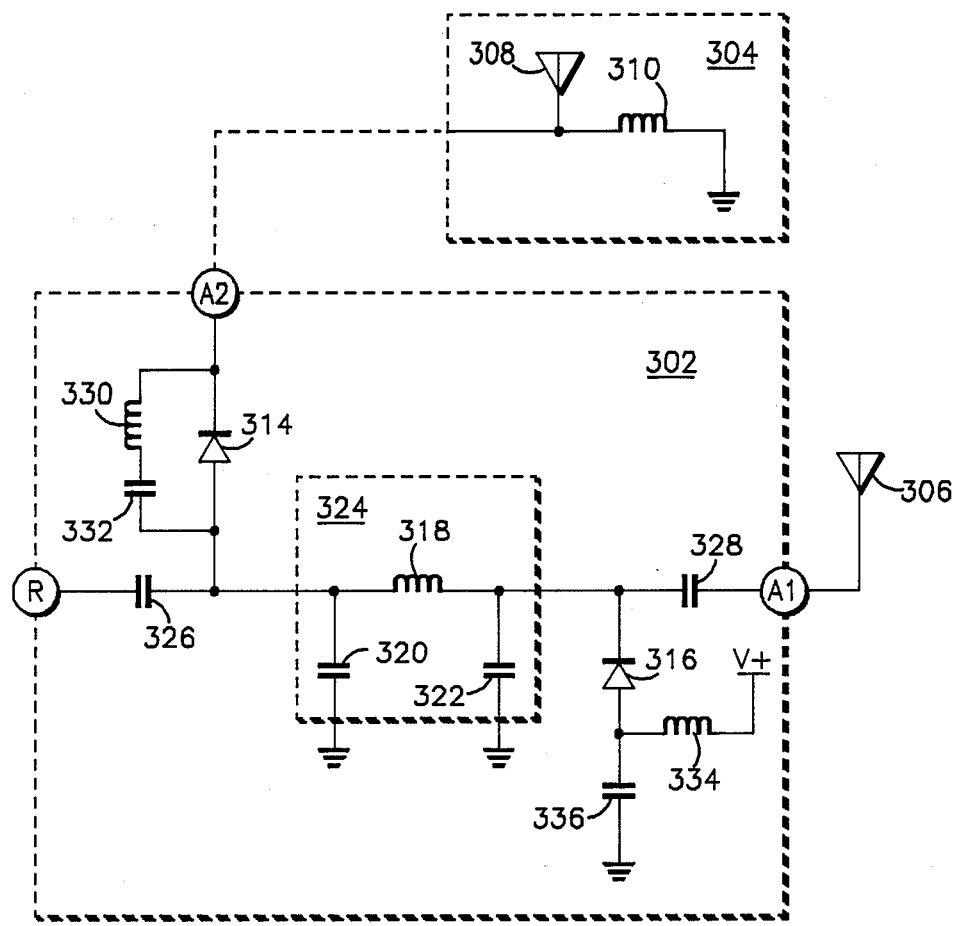
FIG. 3 is a schematic diagram of the preferred embodiment of the three terminal, SPDT antenna switch of the present invention.

FIG. 3 is a schematic diagram of the preferred embodiment of the three terminal antenna switch 302 and remote antenna system 304. An exemplary embodiment of the invention of FIG. 3 that operates in the 840 MHz band will be described. Those skilled in the art will understand how to modify the exemplary embodiment for operation at any other frequency. Part values for the exemplary embodiment are listed in Table 1.

TABLE 1

| PART | VALUE |
| --- | --- |
| Capacitors 326, 328 and 332 | 30 pico-Farads |
| Capacitors 320 and 322 | 2.2 pico-Farads |
| Capacitor 336 | 10 pico-Farads |
| Inductors 310 and 334 | 190 nano-Henries |
| Inductor 318 | .9 nano-Henries |
| Inductor 330 | 65 nano-Henries |

All capacitors are preferably ceramic chip capacitors. Diodes 314 and 316 are preferably PIN diodes, although other types may also be suitable, particularly at low frequencies. PIN diodes are preferred because of their low reversed bias capacitance, which is typically a few tenths of a pico-Farad. Conventional silicon diodes, however, exhibit reversed biased capacitances on the order of tens of pico-Farads. Diodes 314 and 316 are preferably Microwave Associates part no. MA4p739 PIN diodes.

Referring to FIG. 3, antenna switch 302 includes a radio terminal R for connection to the RF input/output terminal of a non-illustrated radio transceiver, a first antenna terminal A1 which is connected to a first or local antenna 306, and a second antenna terminal A2 which can be connected to the remote antenna system 304. The second or remote antenna system 304 includes a second or remote antenna 308, and an RF choke 310. RF choke 310 functions as a low pass filter to permit the flow of DC current from antenna terminal A2 to ground, while providing a high impedance at radio frequencies.

The term "remote" is used to describe the second antenna system because, in the usual application, the second antenna is positioned at a greater distance from the switch than the first or "local" antenna. The physical separation of the antennas from the switch, however, is not to be construed as a limitation of the invention.

Inductor 318 and capacitors 320 and 322 are interconnected to form a lumped element equivalent of a one-quarter wavelength transmission line 324. A conventional onequarter wavelength transmission line would also be suitable.

When antenna terminal A2 is unterminated (i.e., when remote antenna system 304 is not connected to antenna terminal A2), no DC current flows through diodes 314 and 316. Consequently, diodes 314 and 316 are in the open-circuit state and radio terminal R is coupled to antenna terminal A1 through capacitor 326, transmission line 324 and Capacitor 328.

When diode 314 is in the open-circuit state, it exhibits a small reverse bias capacitance that can undesirably couple a small amount of radio frequency energy between radio terminal R and antenna terminal A2. To reduce the effect of this coupling, inductor 330 forms a parallel tuned circuit with the parasitic capacitance of diode 314. This parallel tuned circuit is anti-resonant at the operating frequency, thereby increasing the impedance between radio terminal R and antenna terminal A2. Capacitor 332 is a DC blocking capacitor that also functions as an RF short at the operating frequency.

When antenna terminal A2 is connected to antenna system 304, DC current flows through RF choke 334, diode 316, inductor 318, diode 314 and RF choke 310. This causes diodes 314 and 316 to switch to the conducting state. When diode 314 is conducting, radio terminal R is coupled to antenna terminal A2.

When diode 316 is in the conducting state, it exhibits a small amount of inductive reactance at the operating frequency. Capacitor 336 forms a series resonant circuit with the parasitic inductance of diode 316, thereby reducing the impedance between the cathode of diode 316 and ground. It is well known in the art that if a one-quarter wavelength transmission line is grounded at one end, the driving point impedance at the other end of the transmission line will be infinite. Thus, when diode 316 is in the conducting state, transmission line 324 provides a large impedance between radio terminal R and antenna terminal A1, thereby decoupling antenna terminal A1 from radio terminal R.

Thus, capacitors 326, 328 and 332, inductor 330, diode 314 and transmission line 324 provide a means for coupling radio terminal R to antenna terminal A1, provided antenna terminal A2 is unterminated. Similarly, capacitors 326 and 336, inductor 334, diodes 314 and 316, and transmission line 324 provide a means for coupling radio terminal R to antenna terminal A2, provided antenna terminal A2 is connected to remote antenna system 304.

Figure 4:
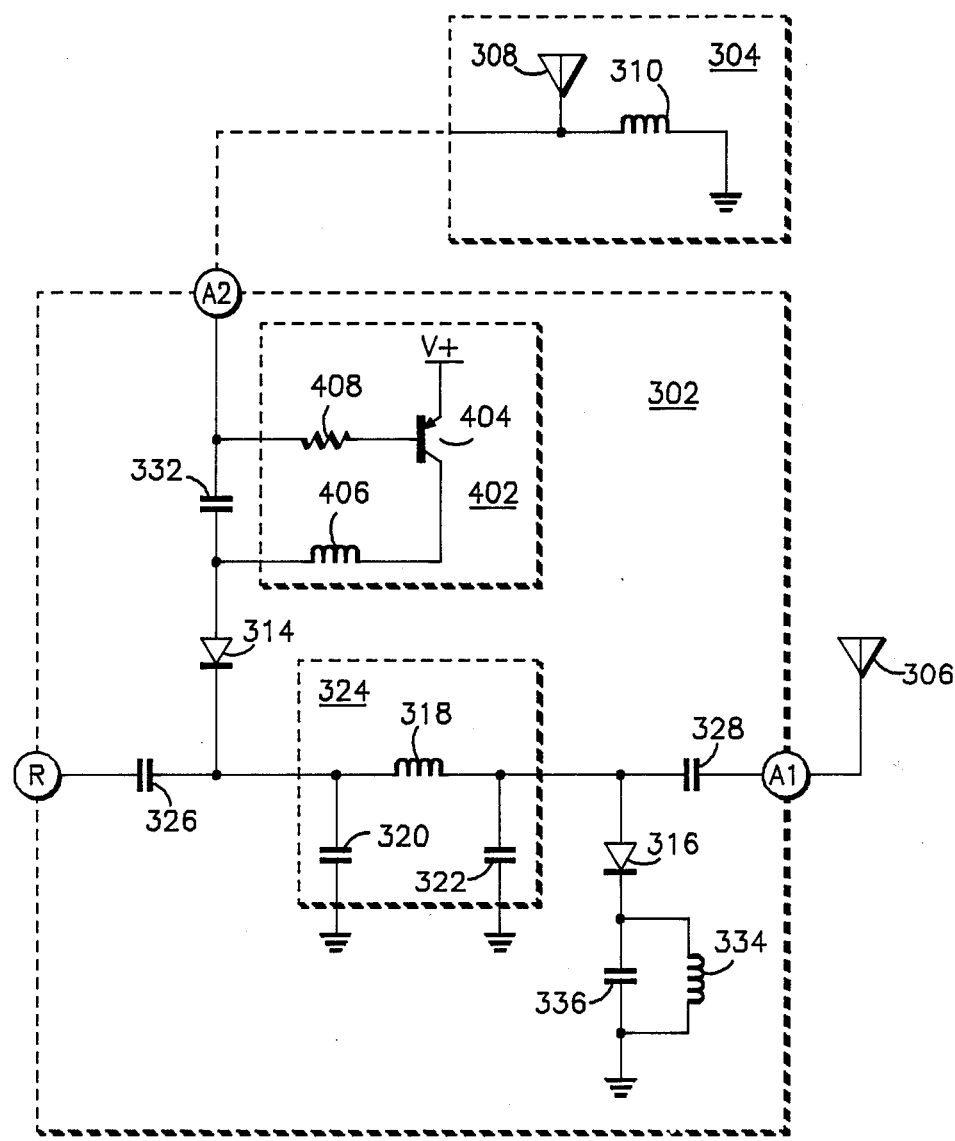
FIG. 4 is a schematic diagram of an alternate embodiment of the three terminal, SPDT antenna switch of the present invention.

A second embodiment of the invention is illustrated in FIG. 4. In this embodiment, the DC bias current for diodes 314 and 316 is supplied by the output of a DC amplifier 402. The input of amplifier 402 is directly connected to antenna terminal A2. When antenna terminal A2 is coupled to remote antenna system 304, DC current flows from the emitter of PNP transistor 404, through the base of the transistor, resistor 408, antenna terminal A2, and RF choke 310, and, finally, to ground. The current in the base circuit of transistor 404 is amplified at the collector, which supplies the bias current to diodes 314 and 316 through RF choke 406. One advantage of the second embodiment is that the DC current flowing through remote antenna system 304 and antenna terminal A2 is much less than that of the first embodiment of FIG. 3. In fact, this DC current can be made arbitrarily small by simply increasing the gain of DC amplifier 402.

A third embodiment of the invention results from a modification of FIG. 3. In this third embodiment, diodes 314 and 316 are reversed (i.e., cathode to anode), inductor 334 is connected in parallel with capacitor 336, and a DC voltage source is inserted between inductor 310 and ground, the negative terminal of the voltage source being grounded. This embodiment functions in a manner similar to the first embodiment illustrated in FIG. 3, but with two significant differences. First, DC current flows through the circuit in the opposite direction. In the first embodiment, DC current flows out of antenna terminal A2 and into remote antenna system 304, while, in this embodiment, it flows from the remote antenna system and into antenna terminal A2. Second, a voltage source is required in the remote antenna system 304.

Although switching from one antenna to the other may be accomplished, as before, by connecting and disconnecting the remote antenna system to antenna terminal A2, this embodiment permits an additional method of switch control. Specifically, if remote antenna system 304 is connected to antenna terminal A2, switching from antenna terminal A1 to A2 may be accomplished by varying the voltage of the remote DC voltage source. When this DC voltage is set at a level sufficient to overcome the forward voltage drop of diodes 314 and 316, radio terminal R will be coupled to antenna terminal A2. If the DC voltage is set below this level, radio terminal R will be coupled to antenna terminal A1. A disadvantage of this third embodiment, however, is that it may be impractical to place a DC voltage source in the remote antenna system.

A fourth embodiment results from a similar modification of FIG. 4. A DC voltage source is included in remote antenna system 304, diodes 314 and 316 are reversed, RF choke 334 is connected to V+ as illustrated in FIG. 3, and an NPN transistor is substituted for PNP transistor 404 with its emitter connected to ground. This fourth embodiment permits switch control by the connection and disconnection of remote antenna system 304 to antenna terminal A2, or by altering the DC voltage of the remote voltage source as described above.

Other variations of these four embodiments could also be constructed using conventional electromechanical relays. For example, a variation of the embodiment of FIG. 3 would include a SPDT relay wherein the common terminal is connected to radio terminal R, the normally closed terminal connected to antenna terminal A1, and the normally open terminal connected to antenna terminal A2. One terminal of the relay coil would be coupled to antenna terminal A2 through an RF choke, while the other coil terminal would be connected to a source of positive voltage.

We claim as our invention:

1. A three terminal antenna switch, for use with a remote antenna system that includes a remote antenna and a low pass filter coupled to said remote antenna, said three terminal antenna switch comprising in combination:
   a radio terminal, and first and second antenna terminals, said first antenna terminal being suitable for connection to a local antenna;
   first coupling means for coupling radio frequency signals between said radio terminal and said first antenna terminal when said second antenna terminal is unterminated; and
   second coupling means for coupling the radio frequency signals between said radio terminal and said second antenna terminal and for impeding the flow of the radio frequency signals between said radio terminal and said first antenna terminal when said second antenna terminal is coupled to said remote antenna;
   such that DC current flows between said remote antenna system and said antenna switch when said remote antenna is coupled to said second antenna terminal, and said DC current causes said second coupling means to be activated.

2. The three terminal antenna switch of claim 1, further comprising:
   a one-quarter wavelength circuit coupled in said first coupling means between said radio terminal and said first antenna terminal;
   a-first diode coupled in said second coupling means between said radio terminal and said second antenna terminal; and
   a second diode coupled to said first antenna terminal.

3. The three terminal antenna switch of claim 2, further comprising a DC amplifier having an input coupled to said second antenna terminal, the output of said amplifier coupled to said first and second coupling means and supplying DC bias current to said first and second diodes when said second antenna terminal is coupled to said remote antenna.

4. A remote antenna switching system, comprising in combination:
   a remote antenna system including a remote antenna and a low pass filter coupled to said remote antenna; and
   a three terminal antenna switch including a radio terminal, first and second antenna terminals, said first antenna terminal being suitable for connection to a local antenna, first coupling means for coupling radio frequency signals between said radio terminal and said first antenna terminal when said second antenna terminal is unterminated, and second coupling means for coupling the radio frequency signals between said radio terminal and said second antenna terminal and for impeding the flow of the radio frequency signals between said radio terminal and said first antenna terminal when said second antenna terminal is coupled to said remote antenna;
   such that DC current flow between said remote antenna system and said antenna switch when said second antenna terminal is coupled to said remote antenna, and said DC current causes said second coupling means to be activated.

5. The remote antenna switching system of claim 4, wherein said three terminal antenna switch includes:
   one-quarter wavelength circuit coupled in said first coupling means between said terminal and said first antenna terminal;
   a first diode coupled in said second coupling means between said radio terminal and said second antenna terminal; and
   a second diode coupled to said first antenna terminal.

6. The three terminal antenna switch of claim 5, wherein said three terminal antenna switch includes a DC amplifier having an input coupled to said second antenna terminal, the output of said amplifier coupled to said first and second coupling means and supplying DC bias current to said first and second diodes when said second antenna terminal is coupled to said remote antenna.

* * * * *